United States Patent [19]
Shimizu et al.

[11] 4,200,374
[45] Apr. 29, 1980

[54] CAMERAS HAVING A COORDINATED ENERGY SUPPLY SYSTEM FOR SHUTTER RELEASE

[75] Inventors: Masami Shimizu, Tokyo; Masanori Uchidoi, Yokohama; Nobuaki Date; Hiroshi Aizawa, both of Kawasaki, all of Japan

[73] Assignee: Canon Kabushiki Kaisha, Tokyo, Japan

[21] Appl. No.: 935,878

[22] Filed: Aug. 23, 1978

[30] Foreign Application Priority Data

Aug. 31, 1977 [JP] Japan .............................. 52-105185

[51] Int. Cl.² ............................................. G03B 7/00
[52] U.S. Cl. ................................... 354/60 R; 354/38
[58] Field of Search ...................... 354/36, 38, 50, 51, 354/60 R, 135, 234, 235, 250, 266, 267, 289, 29, 30

[56] References Cited

U.S. PATENT DOCUMENTS

| 3,636,840 | 1/1972 | Harvey et al. ................. 354/60 R X |
| 4,015,198 | 3/1977 | Iwashita et al. ................. 354/234 X |
| 4,091,395 | 5/1978 | Kozuki et al. ................. 354/60 R X |

Primary Examiner—L. T. Hix
Assistant Examiner—William B. Perkey
Attorney, Agent, or Firm—Toren, McGeady and Stanger

[57] ABSTRACT

A camera having a control system for coordinating the release actuator and electronic shutter with either one of a battery and an electric generator incorporated therein. As the battery has lost electrical energy, the removal of the battery from the camera enables the coordinating system to restrict the manual setting of an exposure time within faster limits and to supply electrical power from the generator to at least that portion of the automatic exposure control circuit which contributes to manual exposure control during the second stroke of the shutter release button, provided that the necessary mechanical energy for driving the generator was created and stored on suitable means during the preceding cycle of film winding operation.

3 Claims, 7 Drawing Figures

CAMERAS HAVING A COORDINATED ENERGY SUPPLY SYSTEM FOR SHUTTER RELEASE

BACKGROUND OF THE INVENTION

This invention relates to cameras having control system for coordinating the various portions of the exposure control apparatus including an electric generator incorporated in the camera.

It is known to provide a camera having an electronic shutter supplied with electrical power from an electric generator, as, for example, in Japanese Laid-Open Patent No. Sho 52-34723. With the camera having broadened capabilities, however, as electrical power must be supplied not only to the electromagnetic actuator and timing circuit controlling the period of actuation of the shutter, but also to the amplifier circuit for the light sensor, exposure value computer, and the display circuit for displaying the exposure value and the various warning signals, and, in the dual priority cameras, further to the complicated coordinating control for the diaphragm and shutter mechanisms, the amount of electrical energy consumed at a time by these portions of the camera tends to exceed the level available from the small generator.

On the other hand, the battery-fed camera often prevents the photographer from making an exposure even in the manual mode as the shutter is electrically operated with power supply from the battery. Where no new battery is obtainable to replace the old one, the multi-purpose camera becomes incapable of performing even the most fundamental function of a simple basic camera.

To obviate this defect the use of a mechanical governor in addition to the timing circuit in controlling the shutter at a region of shorter exposure times has been attempted. The use of such mechanical governor, however, necessitates a relatively large space for the governor and a selection control mechanism to occupy. Further, this shutter arrangement is very disadvantageous in providing both of the shutter and diaphragm preselection automatic exposure ranges. Another attempt has been made to permit the shutter to take an exposure through a control mechanism but the exposure time is limited to only one value when the battery is no longer useful. This provision can not be said to be satisfactory.

Accordingly, it is an object of the present invention to provide a camera having an automatic exposure control apparatus with an electronic shutter cooperating in selective manner with a battery and an electric generator incorporated in the camera. When the actual voltage of the battery is above a satisfactory operating level, the electronic shutter is controlled in accordance with either the output of the exposure value computer or the manually preset value of exposure time, while being supplied with electrical power from the battery.

Another object of the present invention is to make an exposure in the manual mode by supplying electrical power to at least the camera release actuating circuit and shutter control circuit from the generator while preserving a large proportion of the range of exposure times available on the shutter dial, when the full electrical energy of the battery is used up and where no new battery is obtainable at hand.

To achieve this, according to one embodiment of the invention applied to the camera of the shutter preselection automatic exposure control type, the film winding mechanism is automatically brought into driving connection with a spring-powered gear for later application of mechanical energy to the generator in response to removal of the battery from the chamber within the camera housing, provided that the shutter dial is operated to select a desired shutter speed from a region of faster values than $\frac{1}{8}$ second, for example. During the first stroke of the shutter button, the generator is driven by the spring-powered gear to produce electrical energy which is stored on three capacitors. Upon the second stroke, a magnetic winding is energized to release the shutter from the closed position and a timing capacitor starts to be charged with power supplied from the respective capacitors. At the termination of duration of the exposure time, the third capacitor is suddenly discharged through a magnetic winding to close the shutter again.

The present invention will be better understood when reference is had to the accompanying drawings in which:

DETAILED DESCRIPTION OF THE PREFERRED EMBODIMENT

Figure 1:
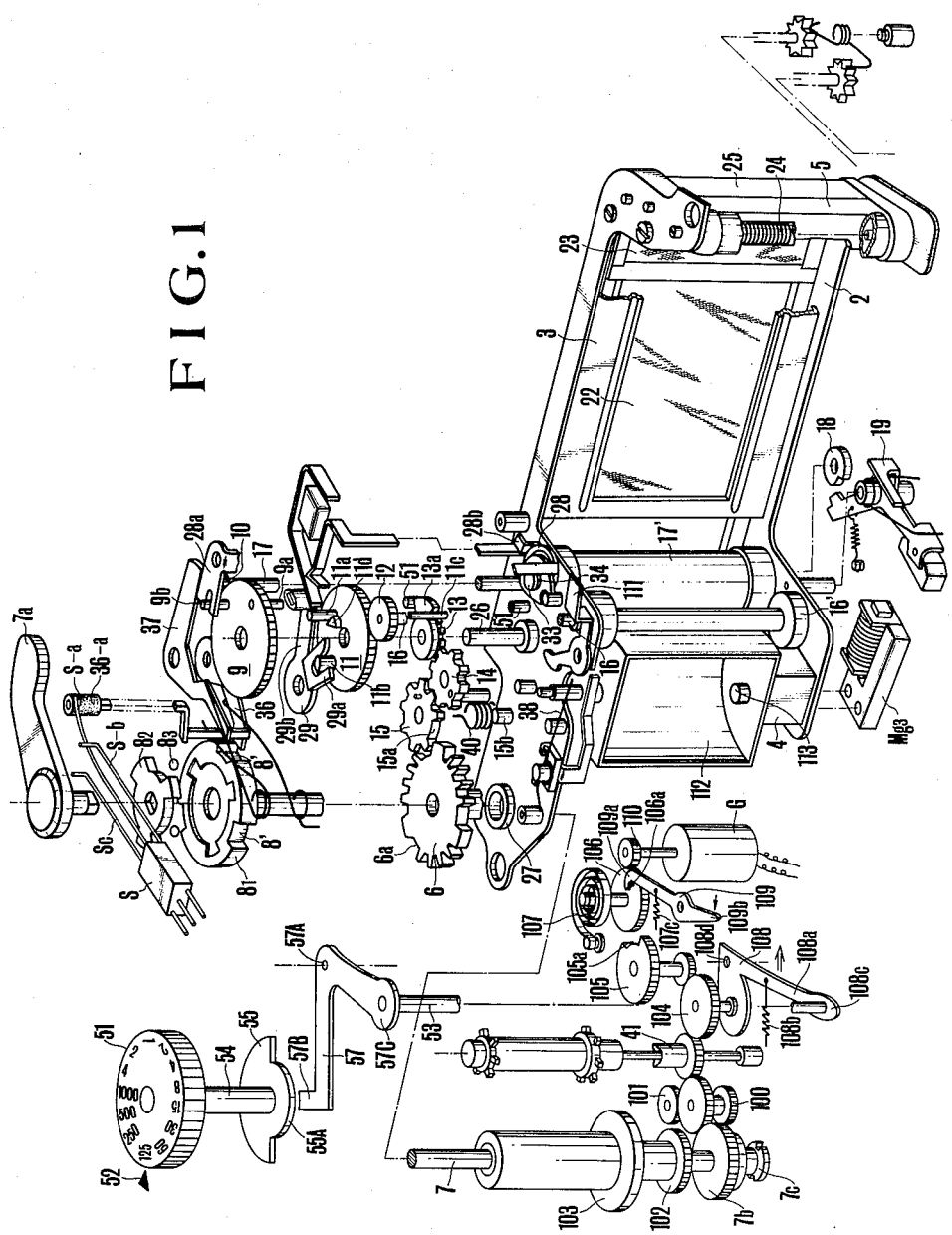
FIG. 1 is an exploded perspective view of one embodiment of the mechanical parts of a coordinating system according to the present invention applied to a camera having an automatic exposure control apparatus with the film winding and shutter mechanisms being shown.

Referring to FIG. 1, there is shown a single lens reflex camera without a housing. A focal plane shutter of the two-curtain type is adapted to be positioned in a space between upper and lower framework plates 1 and 2 for transversing behind a framing aperture plate 3. The plates 1 and 2 are provided with similar cutouts to create a space which a mirror box (FIG. 6) is intended to occupy, and are supported by two columns 4 and 5 on either side of the space. The column 4 is configured to form a battery chamber 112 in an upper portion thereof, a lower portion of which is provided with an inner space containing a part (FIG. 5) of the control system for coordinating a film winding mechanism and an exposure control circuit with an electric generator G, the generator G being located behind the battery chamber 112.

The film winding mechanism for advancing each frame of a photographic film, not shown, for exposure comprises a shaft 7 rotatably fitted in a hole 27 of a bearing on the upper plate 1 and having an arm 7a secured to one end thereof through a one-way clutch 8, the opposite end of which fixedly carries a coupler 7c for receiving driving torque from a motor drive unit, not shown, a gear train beginning with a gear 7b being affixed to the drive shaft 7 and terminating at a gear 102 which is connected to a take-up spool 103 through a suitable friction clutch, not shown, and a sprocket mechanism 41. The mechanism 41 comprises a gear 41 meshing with the two-stage gear 100 and a plunger having a rewind control knob at the bottom end thereof and arranged upon setting in the downmost position to drivingly connect the gear 41 with the sprocket.

A mechanical energy storing and reproducing device for the generator G comprises a power gear 106 meshing with a pinion 110 of the generator G and connected through a shaft to a coil spring 107 at one end thereof, the opposite end of the spring 107 being connected to the camera housing. A latching lever 109 is arranged to disengage at its pawl 109a from a pin 106a on the gear 106 when a shutter release button is depressed to a first stroke at which the lever tail 109b is struck for clockwise movement against the force of a bias spring 107c, whereby the pinion 110 is driven for rotation by the spring-powered gear 106 to produce electrical energy and a clutch gear 104 rotatably mounted on one arm of a L-shape lever 108 and arranged to be brought into engagement with both of the gear 41 and a pinion which latter is automatically connected through a shaft to a control gear 105 in response to removal of a battery from the chamber 112, provided that a shutter dial 51 is previously operated to place a desired one of faster shutter speeds ranging from 1/15 to 1/1000 second in registry with a stationary index 52. This range extends over nearly one half of the shutter speed scale. For this purpose, there is provided a detent mechanism comprising a detent disk 55 affixed to the shaft 54 of the shutter dial 51 and cooperative with a pawl lever 57 in such a manner that when the shutter dial 51 is turned to place any one of the allowable shutter speed values in registry with the index 52, the lever pawl 57B is radially aligned with a peripheral cut-out 55A of the detent disk 55 so that the lever 57 is turned about a pivot axis 57A in a clockwise direction along with the lever 108, as a linkage 53 is connected at between the lever arms 57C and 108c.

Figure 2:
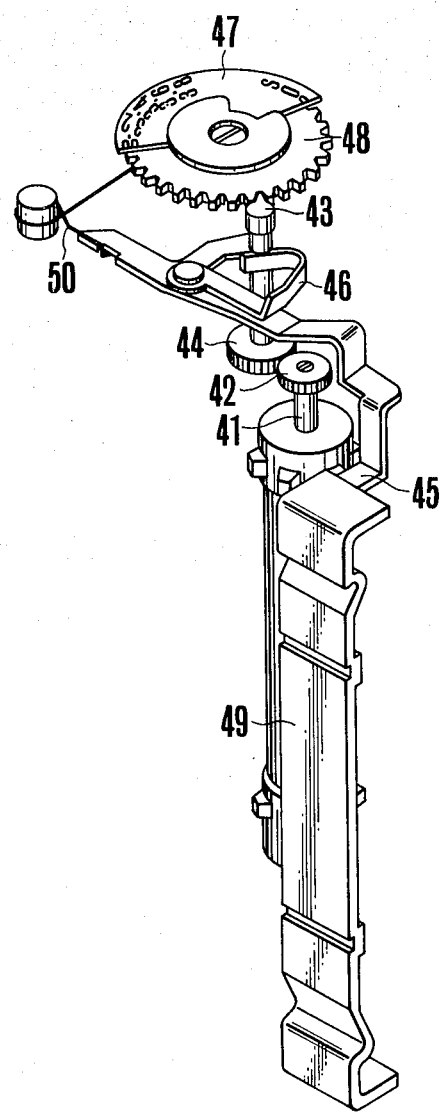
FIG. 2 is a perspective view of a film frame indexing mechanism cooperating with the sprocket of FIG. 1.

In FIG. 2, the sprocket shaft 41 has a gear 42 fixed at the top end thereof. When the film is advanced one frame by the sprocket, a one-tooth gear 43 is driven for one revolution in a clockwise direction through a gear 44 affixed to a common shaft of the gear 43 and which is engaged with the gear 42. A control lever 45 for returning a frame scale disc 47 to its zero position has a leaf spring 46 of which one end is fixedly secured to the pivot shaft of the lever 45. When a back cover 49 of the camera is closed, the control lever 45 is turned in a counter-clockwise direction along with the spring 46 to urge the one-tooth gear 43 for driving engagement with a gear 48 on which the disc 47 is mounted. When the back cover 49 is opened, a hair pin spring 50 drives the lever 45 for clockwise movement until the gear 43 is disengaged from the gear 48, thereby the frame scale 47 is reset to the zero position.

Turning to FIG. 1, the focal plane shutter has leading and trailing or front and rear curtains 23 and 22 respectively disposed behind the framing aperture plate 3. The front curtain 23 is wound on a winding drum 25 when the shutter is released. The rear curtain 22 is drawn from a drum with a pair of tapes on the upper and lower sides of a forward border thereof being wound on respective drums 24 when the shutter is operated. The curtains 23 and 22 are controlled by coaxially mounted gears 11 and 9 respectively through pinions 12 and 10 which are fixedly mounted on the top ends of drum shafts 17 and 16. The gears 11 and 9 are moved from the illustrated positions by a cocking mechanism.

Figure 3:
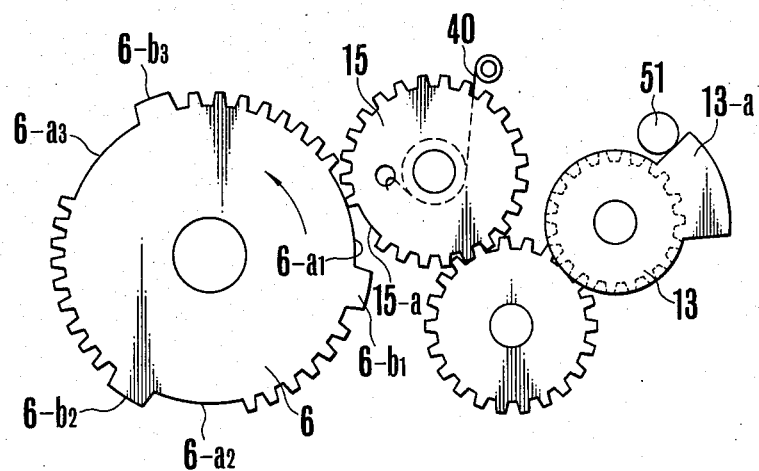
FIG. 3 is a top view of a gear train through which a fraction of the driving torque of the film winding lever is transmitted to reset the shutter mechanism of FIG. 1.

By reference also to FIG. 3, the cocking mechanism comprises a gear 6 affixed to the drive shaft 7, a train of three gears 15, 14 and 13 in this order from the gear 6 to the gear 11, a first bar 11c extends downwardly from the gear 11 into the path of movement of a lug 13a of a disc which is fixedly mounted on the gear 13, and a second bar 9a extends from the gear 9 into the path of movement of a pin 11a on the upper surface of the gear 11. The full length of cocking movement of the arm 7a causes exactly one third revolution of the driven shaft 7, as is controlled by an indexing lever 36 in engagement with one of three peripheral recesses 8' of a rim of the one-way clutch 8, the recesses being spaced from each other by an angular distance of 120°. The constructional features of the gear 6 are that three or four successive teeth are cut off at the base circle in each of three sections 6-$a_1$, 6-$a_2$ and 6-$a_3$ spaced from each other by an angular distance of 120°, and that each of the sections 6-$a$ is followed by a tooth 6-$b_1$, 6-$b_2$ or 6-$b_3$ of a thickness equal to almost 3 times that of each normal tooth, as is formed by filling the tooth space between the successive two teeth. For engagement with each of such doubled teeth 6-$b$, there is provided a toothless space having a width of two or three teeth on the base circle of the gear 15 which is indicated at 15-$a$. Such corresponding constructions of the gears 6 and 15 assure that when each cycle of film winding operation has been completed, the gear 15 is returned under the action of a spring 40 since the teeth of the gear 15 slip in the toothless space 6-$a$, and when the next cycle of film winding operation is performed, the gear 6 is brought into engagement with the gear 15 without failure by virtue of the doubled tooth 6-$b$ and the toothless space 15-$a$. To facilitate smooth process for establishing driving connection between the gears 6 and 15, it is preferred to increase the diameter of the addendum circle of the tooth 6-$b$ and to correspondingly decrease the diameter of the base circle of the tooth lack 15-$a$.

Figure 4:
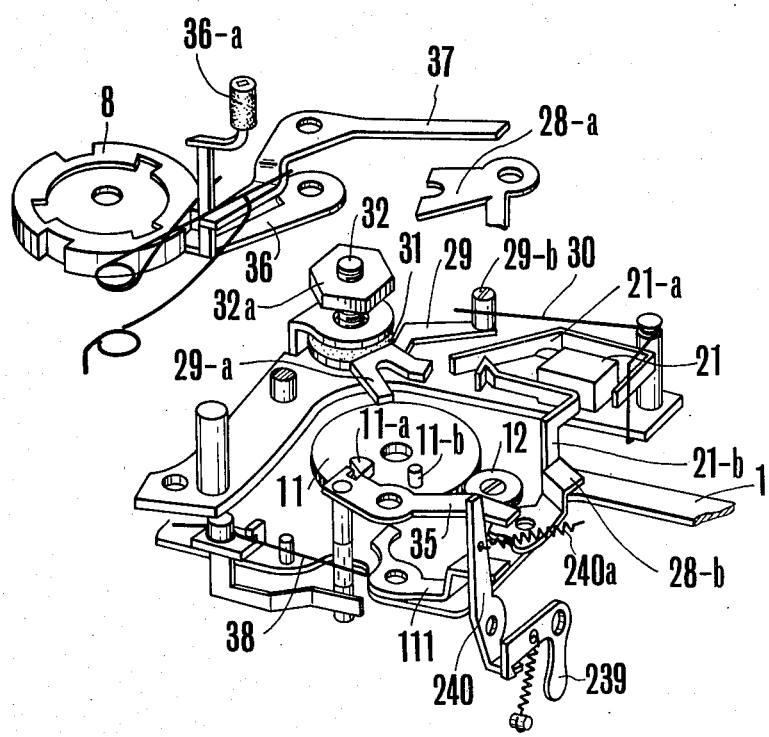
FIG. 4 is a perspective view of a control mechanism for actuating the front curtain master gear of FIG. 1 for running down movement, and for braking that gear at the terminal end of movement.

During the cocking operation, the sector 13-$a$ is turned from the illustrated position about a common axis of the leading and trailing curtain control gears 11 and 9 in a clockwise direction, while the gears 11 and 9 are simultaneously turned in the same direction through the sector 13a-and-first bar 11c connection and through the pin 11a-and-second bar 9a connection respectively to move the front and rear curtains 23 and 22 from the drums 25 and 24 across the face of film against the force of drive springs in the drums 24 and 25, until the pin 11a is engaged with a latching lever 35 as shown in FIG. 4. Such clockwise movement of the rear curtain control gear 9 causes counter-clockwise movement of a braking lever 28 about a pivot pin 33 which in turn causes clockwise movement of a control lever 37 for admitting a clockwise movement of the indexing lever 36 under the action of a bias spring 36b. When the rim 8' is moved 120° to align one of the recesses with the pawl of the indexing lever 36, the latter is turned clockwise to a position where a switch S cuts off electrical power supply to a motor drive unit, not shown, and renders operative a camera release device (FIGS. 6 and 7), as a movable contact S-a of the switch S is taken out of contact with a fixed contact S-b and is then brought into contact with a fixed contact S-c by an electrically insulated arm 36-a upwardly extending from the indexing lever 36.

FIG. 4 shows an arrangement of control means for coordinating the front curtain control gear 11 with the latching lever 35, a braking lever 29 and a flash photography control switch or X-contact 21. When a reflex mirror 238 (FIG. 6) is flipped upward by a spring-powered drive lever 234, a projection 234d strikes a L-shape lever 239 at its head so that a lever 240 is turned in a clockwise direction by the action of a drive spring 240a, causing the latching lever 35 to disengage from the pin 11a, and therefore causing the gear 11 to turn in a counter-clockwise direction. In one half revolution of the gear 11, the pin 11b is caught by the braking lever 29 at a forked portion 29a thereof. Since the lever 29 is mounted through a frictional material 31 on the upper framework plate 1 by a bolt 32 and nut 32a, the speed of rotation of the gear 11 is moderately decreased by absorbing shock and further preventing bouncing of the gear 11. A return spring 30 also contributes to such braking effect. The synchro-switch 21 is arranged adjacent one arm 29b of the braking lever 29 to be closed when the gear 11 acts on the braking lever 29, or when the shutter is fully opened. A count start switch $S_4$ which is connected across a timing capacitor $C_T$ (FIG. 7) is arranged to be opened when the latching lever 35 is actuated, as a pin 35a downwardly extending from the head of the latching lever 35 moves the switch $S_4$ against the force of a spring 38. Such construction and arrangement of the braking mechanism for the front curtain apply to that for the rear curtain whith a pin 9b and a forked arm 28a of a braking lever 28 except for the function of another arm 28b which opens the synchro-switch 21, as the arm 28b acts on a second contact 21b of the switch 21, while the arm 29b on the first contact 21a thereof. The arm 28b also serves to operate a mirror return control lever 242 (FIG. 6).

Figure 5:
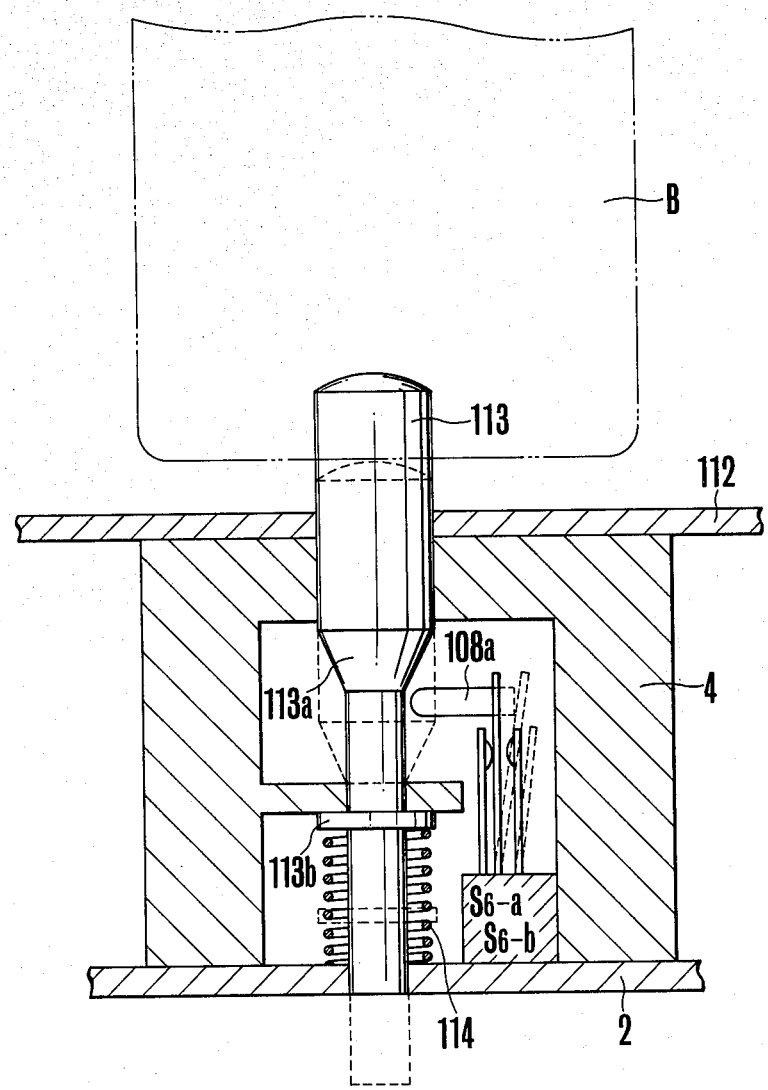
FIG. 5 is a partly sectional partly elevational view of a battery detector arranged in a space within a support of the battery chamber that moves upon removal of the battery from the dashed to the solid line position where the generator is operative.

FIG. 5 is a vertical sectional view of a battery detecting mechanism as viewed from the right in FIG. 1. An electrically conductive rod 113 extends through and outwardly beyond a hole provided through the wall of a bottom panel of the battery chamber 112, as it is biased by a compressed spring 114 around a lower part of the rod 113 between the lower framework plate 2 of the camera and an annular flange 113b. When a battery B is inserted into and seated at the chamber 112, the rod 113 is depressed to a position illustrated by a dashed line while simultaneously moving the lever 108 and also lever 57 to disengage the clutch gear 104 from both of the gears 41 and 105, and the pawl 57B from the detent disk 55 respectively. Such movement of lever 108 also causes movement of a switch $S_6$ from its "a" to its "b" position illustrated by a solid and dashed line respectively. When the battery B is removed from the chamber 112, the lever 108 is moved in sliding engagement with the tapered portion 113a by the spring 108b, provided that the shutter dial 51 is set in the region of faster speeds from 1/15 to 1/1000 second. If the shutter dial 51 is left unchanged in position from a region of slower speeds from ⅛ to 4 seconds at the time of removal of the battery B, the lever pawl 57B is brought into abutting engagement with the large diameter portion of the detent disk 55 to prevent motion transmission from the film winding mechanism to the mechanical energy storing mechanism and movement of the switch $S_6$ from "a" to "b" position from occurring. Once the lever pawl 57B drops into the small diameter portion of the detent disk 55, it is impossible to move the shutter dial 51 from the faster to the slower region until the rod 113 is depressed by an operator's finger or by the insertion of a new battery.

Figure 6:
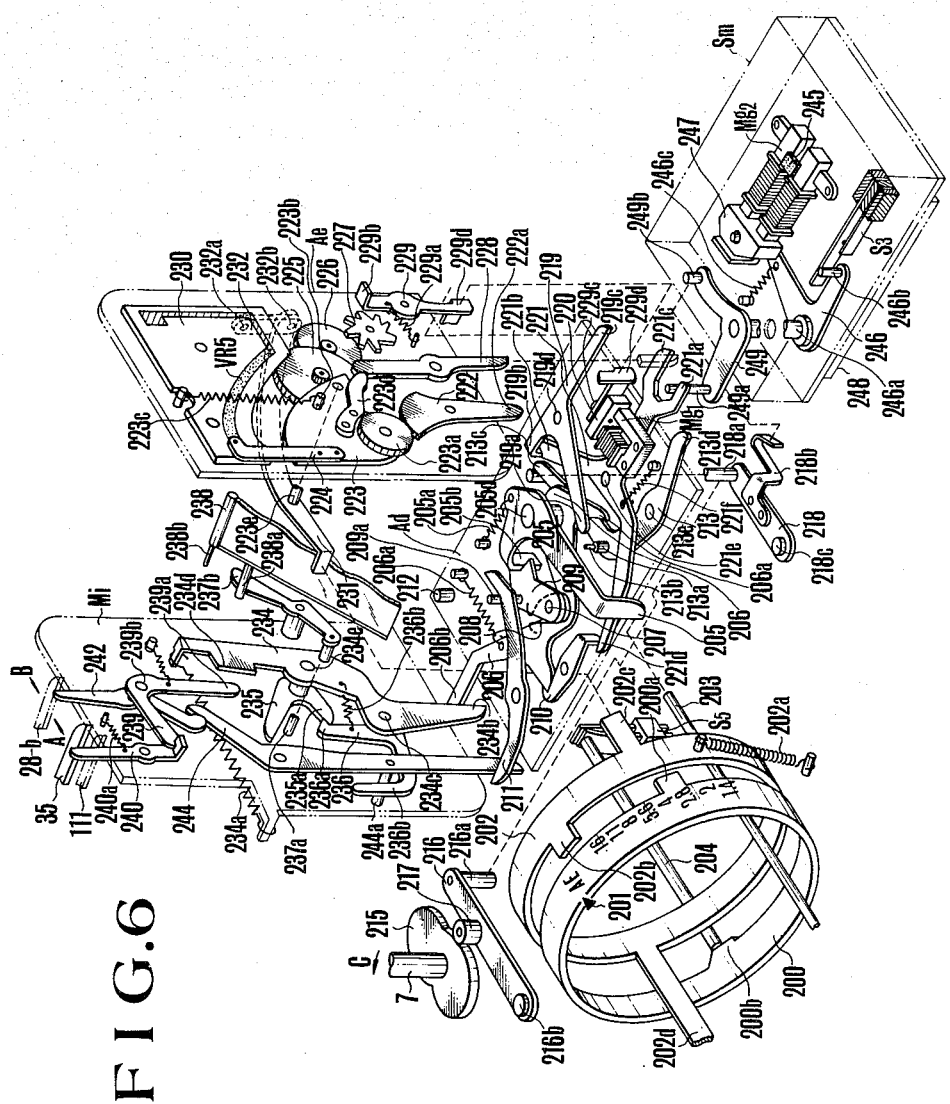
FIG. 6 is an exploded perspective view of an example of construction and arrangement of the various elements of a camera release, mirror drive and diaphragm control unit surrounding the mirror box of FIG. 1.

FIG. 6 shows a coordinating mechanism for a release actuator, mirror control, diaphragm scanner with a lens aperture mechanism, and resetting mechanism, each of which will be explained below. Each of these portions of the camera are shown in the positions that they occupy when the camera is cocked.

The lens aperture mechanism comprises a diaphragm ring 200 having a diaphragm value scale of 1.4 to 16 and a symbol "AE" for automatic adjustment of diaphragm aperture beyond the diaphragm scale, a stop lug 200a for engagement with a projection 202b of a presetting ring 202, and a cam lobe 200b arranged upon rotation of the ring 200 till the registry of "AE" with a stationary index 201 to push a cam follower pin 204 rearward to close a switch $S_5$. The presetting ring 202 has a rearwardly extending arm 202c abuttingly engaged on a control lever 231 under the action of a spring 202a, and a forwardly extending arm 202d cooperating with a presetting cam, not shown. A pin 203 extends from a diaphragm blade control ring, not shown, into the path of movement of a diaphragm closing down lever 205.

The camera release actuator Sm is contained in a casing made of non-magnetic material with a magnetic flux shielding support plate 248 and comprises a combination of a magnetic winding $Mg_2$ with a permanent magnet piece 245, a crank lever 246 having a shaft 246a journaled in a hole through the wall of an upper panel of the casing, an armature 247 pivotally mounted on a crank pin, and an output lever 249 fixedly mounted on the top end of the crank shaft 246a and having two arms on which respective upwardly extending pins 249a and 249b are located. When the magnetic winding $Mg_2$ is energized to cancel the magnetic flux of the permanent magnet 245, the armature 247 is moved away from the yoke by the action of a spring 246c, and at the same time, a memory switch $S_3$ is opened by a pin 246b, as the crank lever 246 is turned counter-clockwise. Motion of the crank lever 246 is transmitted through the output lever 249 to turn a three-armed lever 221 about a pivot axis 221e against the force of a bias spring 221f in engagement at a finger of an arm with the pin 249a. Such clockwise movement of the lever 221 causes actuation of the diaphragm scanner and the diaphragm closing down and mirror drive mechanisms on respective unit boards Ae, Ad and Mi.

The diaphragm scanner Ae comprises a sector gear 223 connected at a pin 223b to a spring 223c which is weaker than the spring 202a and which urges the sector gear 223 to return to the initial position illustrated, a slider 224 radially extending from the sector gear 223 and having a brush slidably movable on an arcuate resistance track $VR_5$, speed-up gears 225 and 226 between the sector 223 and a star gear 227, and an arresting lever with an armature 220 pivotally mounted at 229c on the tail 229d thereof to cooperate with a magnetic winding $Mg_1$ in such a manner that when the magnetic winding $Mg_1$ is energized, the lever 229 is turned in a counter-clockwise direction by the action of a spring 229a to engage one of the teeth of the star gear 227. The scanning result is translated to the proper angular position of the presetting ring 202 by the control lever 231 which is connected through an eccentric pin 223e to the sector 223.

In the diaphragm closing down mechanism Ad, when the pawl lever 210 is disengaged from a lever 206, the latter is turned about a pivot shaft 205d in a clockwise direction by the action of a drive spring 205a, while simultaneously moving a lever 205 about the common shaft 205d of the drive lever 206 in engagement at a rectangularly bent-off portion 205c with the pin 203, as a diaphragm return control lever 209 pivotal at 207 on the lever 206 is maintained in engagement with a second rectangularly bent-off portion 205b by a spring 208.

In the mirror drive mechanism Mi, a spring 234a powered drive lever 234 follows up the diaphragm drive lever 206, while moving a mirror 238 from its viewing to its non-viewing position through a mechanism. This mechanism comprises a V-shaped lever 235 pivotally mounted on a common shaft 234e of the drive lever 234, a U-shaped mirror return control lever 236 movably mounted on a pivot pin 234c and connected to a spring 236b to urge a lever pawl 236a for engagement with a lower arm 235a of the V-shape lever, and a control lever 237 pivotally mounted on the board Mi and having a pin 237a extending into a space between the two arms of the lever 235 at a point near the upper arm thereof when in cocked position, the opposite arm of the control lever 237 being tapered at the end portion thereof to bear a rod 238a of a bracket for the mirror 238 which is pivotally mounted on stub shafts 238b.

After an exposure has been completed, when the gear 9 (FIG. 1) is caught by the braking lever 28, a lever 242 on the board Mi is turned counter-clockwise which causes clockwise movement of a lever 244 so that a pin 244a strikes the mirror return control lever 236 at its tail 236b to disengage the pawl 236a from the lever arm 235a, thereby the mirror 238 is returned to the viewing position illustrated. Such clockwise movement of the lever 244 also causes counter-clockwise movement of a lever 211 to disengage the diaphragm return control lever 209 from the lever 205, as the lever 211 acts on a pin 209a upwardly extending from the lever 209, thereupon the lever 205 is turned counter-clockwise by the action of a spring 205a.

A resetting mechanism includes a cam plate 215 fixedly mounted on the film winding shaft 7, a first lever 216 pivotally mounted at 216b and rotatably carrying a cam follower 217, a second lever 218 pivoted at 218c and having an upwardly elongated pin 218a connected to a pin 216b through a linkage, not shown, and a third lever 213 carrying a roller 213a on an axel 213b of a length twice that of the roller 213a. Before the camera is cocked, the diaphragm drive lever and escapement are abuttingly engaged at their arms 206a and 219a with the roller 213a and axel 213b respectively. When the winding lever 7a is cocked, the cam plate 215 is turned in a direction indicated by an arrow C, causing the lever 216 to reciprocate along with the lever 218 at first to the right and then to the left. During the rightward movement, the diaphragm drive lever 206 and escapement 219 are returned to the initial positions where they are latched by the pawl lever 210 and an arm 221b of the lever 221 respectively, as the pin 218a acts on the arm 213c. Such clockwise movement of the lever 213 also causes counter-clockwise movement of the sector 223 through a gear 223a-and-a sector gear 222 connection, as an arm 222a of the sector gear is engaged with an arm 213d, until the sector 223 is latched by a pawl lever 228 engaging with a projection 223d thereof. As the escapement 219 is turned clockwise, the arresting lever 229 is turned clockwise to disengage from the star gear 227, and the armature 220 is positioned near the magnetic winding Mg$_1$. To return the armature 247 to the initial position, a resilient member 218b is mounted on the lever 218 and engages a pin 249b on the lever 249. To reset the front curtain actuating lever 240, a lever 111 is moved in a reverse direction to that indicated by arrow A.

Figure 7:
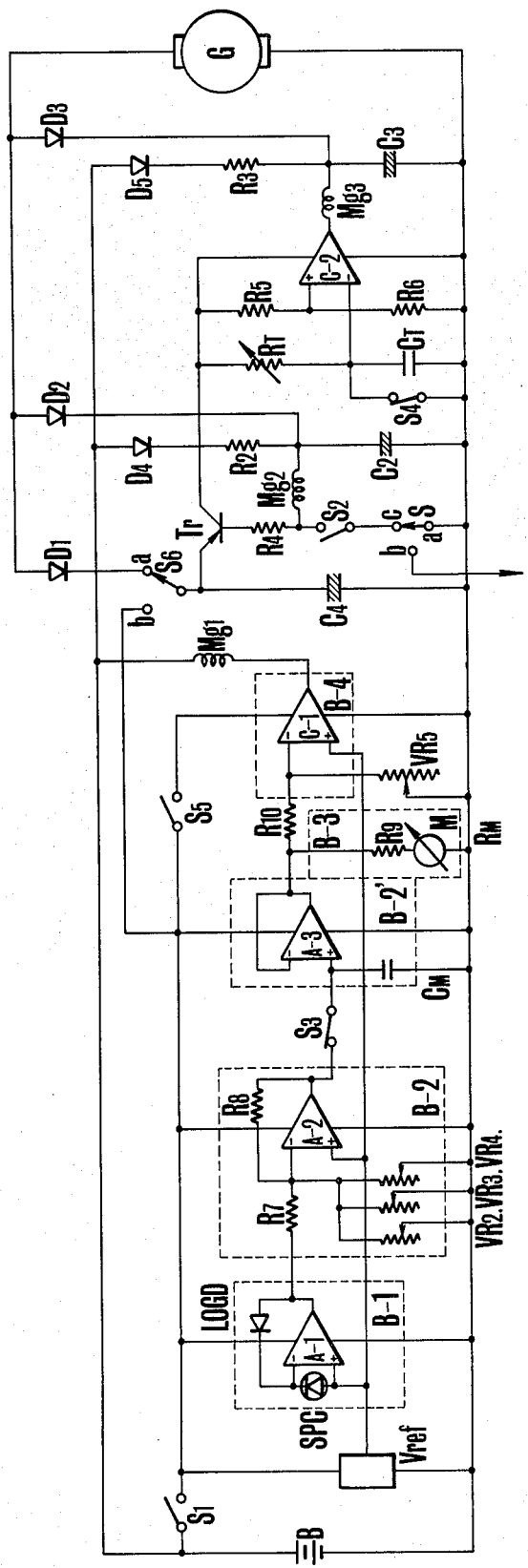
FIG. 7 is a schematic electrical circuit diagram of the automatic exposure control apparatus and coordinating system of the camera of FIGS. 1 to 6.

FIG. 7 shows one embodiment of the circuitry of the camera of FIGS. 1 to 6 according to the present invention comprising, in combination, first and second electrical power sources, an automatic diaphragm control circuit, a shutter control circuit, an electric-motor driven film feed control circuit, a camera release control circuit and a coordinating circuit for these sources and circuits.

The automatic diaphragm control circuit includes a light measuring circuit B-1 comprising a photo-sensitive element such as a silicon photo-cell SPC, an operational amplifier A-1, and a logarithmic compression diode LOGD connected in the feedback network of the operational amplifier A-1. Brightness information from the circuit B-1 is combined with film speed, shutter speed and curvature correction factor information from variable resistors VR2, VR3 and VR4 by an operational amplifier A-2 with a resistor R$_8$ to produce an output voltage representative of an exposure value, in this instance, diaphragm value. The output of the exposure value computer B-2 is fed through a memory control switch S$_3$ to a memory circuit B-2′ comprising a storage capacitor CM and an operational amplifier A-3. The output of the memory circuit B-2′ is applied to a diaphragm value display circuit B-3 including a meter M and also to a comparator C-1 at an inversion input thereof to which the output of the variable resistor VR5 (FIG. 6) also is applied, a non-inversion input of the comparator C-1 being connected to a reference voltage source Vref. When the output of the variable resistor VR5 has reached a level dependent upon the output of the exposure value computer B-2, the magnetic winding Mg$_1$ is energized with power supply from the first source or battery B.

The camera release control circuit comprises a switch SW$_2$ arranged to be closed when the shutter button is depressed from the first to the second stroke, and the magnetic winding Mg$_2$ connected in series to the switch S$_2$.

The shutter control circuit comprises a timing capacitor C$_T$, a variable resistor R$_T$ cooperative with the shutter speed setting dial 51 and connected in series to the timing capacitor C$_T$, and a comparator C-2 connected to the output of the timing circuits R$_T$ and C$_T$ at the inversion input thereof, the non-inversion input of which is connected to the output of a reference voltage source of resistors R$_5$ and R$_6$, and having an output connected to a magnetic winding Mg$_3$ (FIG. 1).

The coordinating control circuit comprises the switch S$_1$ connected in a power supply path from the positive terminal of the battery B to the automatic diaphragm control circuit, a switch S$_5$ connected in series to the switch S$_1$ to control power supplied to the comparator C-1, the battery responsive switch S$_6$ with a fixed contact, b, connected to a point on connection between the switches S$_1$ and S$_5$ and with a movable contact connected both to a first current impulse generator in the form of a condenser $C_4$ and to an emitter of a power supply control transistor Tr for the shutter control circuit. The base of the transistor Tr is connected through a resistor $R_4$ to the fixed contact of the switch $S_2$. The switch S with a fixed contact, b is connected to the winding of an electric motor for assisting in advancing the film stepwise, and has a fixed contact, c, connected to the movable contact of the switch $S_2$. Second and third current impulse generators or condensers $C_2$ and $C_3$ are connected to the magnetic windings $Mg_2$ and $Mg_3$ respectively. Three rectifying diodes $D_1$, $D_2$ and $D_3$ have their anodes connected through a common lead to one end of a winding of an electric generator G as the second electrical power source and their cathodes connected to the respective condensers $C_4$, $C_2$ and $C_3$ except for the diode $D_1$ through a fixed contact, a, of the switch $S_6$. Two reverse current preventing diodes $D_4$ and $D_5$ have their anodes connected through a common lead to a point on connection between the positive terminal of the battery B and the magnetic winding $Mg_1$ and their cathodes connected through respective resistors $R_2$ and $R_3$ to the condensers $C_2$ and $C_3$. Switch $S_4$ is connected across the timing capacitor $C_T$.

The operation of the camera of FIGS. 1 to 7 is as follows. A fresh battery is inserted into and seated in the chamber 112, thereby the electric generator G is rendered inoperative, and the switch $S_6$ is set in "b" position. When the shutter button is depressed to a first stroke, the switch $S_1$ is closed to supply electrical power from the battery B to blocks B-1, B-2, B-3 and B-4 so that the exposure value is displayed by the meter M. Upon further depression of the shutter button to the second stroke, the switch $S_2$ is closed to render the transistor Tr conducting, thereby the magnetic winding $Mg_2$ in the camera release actuator Sm is energized from the momentary current impulse generator or condenser $C_2$ to cancel the magnetic flux of the permanent magnet 245. As the crank lever 246 is turned counter-clockwise by the action of the spring 246c, the memory switch $S_3$ is opened to store the output of the exposure value computer B-2 in the capacitor Cm, and the output lever 249 outside of the casing is driven for counter-clockwise movement which is transmitted to the three-armed lever 221. As the lever 221 is turned about shaft 221e, a hooked portion 221b is at first disengaged from a downwardly extending projection 219 of the escapement. At this time, the magnetic winding $Mg_1$ is already energized to retain the arresting lever 229 in the attracted position against the force of spring 229a so that the disengagement of the escapement does not result in movement of the arresting lever 229.

As the lever 221 is further turned, the finger 221c strikes the pawl lever 228 at the tail thereof, causing start of scanning movement of the slider 224 by the action of spring 202a which overcomes the spring 223c. During this scanning operation, the gears 225, 226 and star wheel 227 rotate at progressively increasing speeds. The output of the variable resistor VR5 is compared with the output of exposure value computer upon coincidence to actuate the magnetic winding $Mg_1$ for de-energization, thereupon the arresting lever 229 is turned counter-clockwise to engage one of the teeth of the star wheel 227, with the resulting angular position of the sector gear 223 being translated to the proper diaphragm value through the lens aperture mechanism.

At about the same time the pawl lever 228 is struck, the pawl lever 210 is turned counter-clockwise to disengage from the diaphragm drive lever 206. As the lever 206 is driven to turn, the diaphragm closing down pin 203 is moved to the left by the lever 205, thereby the size of opening of the diaphragm aperture is adjusted to the presetting. During this time, the mirror is moved from the viewing to the non-viewing position, where the front curtain actuating lever 240 is disengaged from the lever 239 by the projection 234d of the mirror drive lever.

When the latching lever 35 is struck by the actuating lever 240, the front curtain master gear 11 starts to rotate along with the pinion 12 and shaft 16 by the action of spring in the drum 25 and the count start switch $S_4$ also is opened. Just before the terminal end of movement of the front shutter curtain, the pin 11b on the master gear 11 is caught by the braking lever 29 and the gear 11 is stopped while the braking lever 29 is turned to bring the first synchro-contact 21a into electrical contact with the second contact 21b. At this time, a flash tube is triggered.

At the termination of duration of a time interval determined by the time constant of the timing circuit $R_T$, $C_T$, the comparator C-2 changes its output from high to low level at which time the magnetic winding $Mg_3$ is energized in the impulse form from the condenser $C_3$, causing a rear curtain latching lever 19 (FIG. 1) to be disengaged from a pawl disk 18 which is affixed to the pinion shaft 17 for the rear curtain. Thus, the rear curtain runs down to terminate the exposure. The braking mechanism for the rear curtain operates in a similar manner to that described in connection with the front curtain.

The movement of the braking lever 28 causes disengagement of the indexing lever 37 from the recess 8', and also causes movement of the switch S from "c" to "b" position where the electric motor, not shown, is energized to operate the film winding mechanism for advancing the film through the length of one frame. Such movement of the braking lever 28 further causes counter-clockwise movement of the mirror return control lever 236 and the diaphragm return control lever 209, thereby the mirror is mvoed to the viewing position, and the diaphragm aperture is fully opened.

During the film winding operation, the camera is reset to the cocked position as follows: Counter-clockwise movement of the cam disk 215 causes clockwise movement of the charge transmitting lever 216 and also the intermediate lever 218 which causes clockwise movement of the charge lever 213 about the axis 213c through the pin 218c, thereby the diaphragm drive lever 206 is brought into latching engagement with the pawl lever 210, and at the same time, the escapement 219 is driven to move the armature 220 toward the yoke of the magnetic winding $Mg_1$ while the arresting lever 229 is disengaged from the star wheel 227. Such movement of the diaphragm drive lever 206 causes clockwise movement of the mirror drive lever 234. The latter is latched in cocked position by the common lever 210 of the diaphragm drive lever 206. The mirror return control lever 236 also is brought into engagement with the V-shape lever 235.

At the same time as that when the diaphragm and mirror drive mechanisms are reset, the automatic diaphragm control mechanism is reset as follows: The charge lever 213 turns the charge gear 222 in a clockwise direction until the sector gear 223 is latched by the pawl lever 228 engaging with the projection 223d. As the sector gear 223 is turned counter-clockwise, the control lever 231 is lifted up while bearing the arm 202c of the diaphragm presetting ring 202. On the other hand, the intermediate lever 218 also moves the armature 247 in the camera release actuator Sm toward the yokes of the magnetic winding Mg$_2$, as the output lever 249 is turned clockwise in engagement at the pin 249b with the resilient member 218b against the force of spring 246c. The resilient property of the member 218b absorbs the difference of the movement of the lever 218.

The cocking mechanism operates as follows: During one cycle of film winding operation, the doubled tooth 6b of the gear 6 is at first engaged in the cut-out 15a of the gear and then the gear 6 is rotated 120° in engagement with the gear 15. Rotation of the gear 15 is transmitted through the gear 14 to the gear 13 on the common shaft of the master gears 11 and 9, and therefrom through the projection 13a-and-bar 11c connection to the front master gear 11 and through the pin 11a-and-bar 9a connection to the rear master gear 9. As the gears 9 and 11 are rotated, the pinion shafts 17 and 16 are rotated to wind up the rear and front curtains 22 and 23 thereon respectively, while charging the springs in the drums 24 and 25, and the braking levers 28 and 29 also are turned by the respective pins 9b and 11b. Such movement of the braking lever 29 opens the first synchro-contact 21a. As the braking lever 28 is turned, the winding stop lever 36 is allowed to slidably move on the periphery of the one-way clutch rim 8. When the lever 36 is dropped into the recess 8', the shaft 7 rotates no more, and the switch S is moved from "b" to "c" position where the electric motor is cut off from the power supply. The charge lever 11 is turned clockwise by the gears 14 and 15 to bring the lever 109 into engagement at one end 109a with the hooked portion 108a. When the front master gear 11 has reached a position where the pin 11a is latched by the lever 35, the pawl 18 of the pinion shaft 17 is latched by the lever 19. After that, the slack 6a of the gear 6 is radially aligned with the gear 15, thereupon the gears 13, 14 and 15 are returned to the initial positions by the action of the spring 40. Further, rotation of the sprocket 41 causes advancement of the frame index plate 47 one tooth of the gear 48.

With the battery B seated in the chamber 112, the changeover lever 108 is set by the tapered portion 113a of the detector rod 113 to the leftmost position where the clutch gear 104 is disengaged from the gears 41 and 105. For this reason, motion of the drive shaft 7 is not transmitted to the gear 105. At the same time, the lever pawl 57B is retracted from the path of movement of the detent disk 55, permitting the operator to select any value of shutter speed available on the shutter dial 51 for registry with the index 52.

Next, when an exposure is to be made in manual mode, the operator needs to turn the diaphragm ring 200 to place a desired diaphragm value in registry with the index 201, thereby the switch S$_5$ is automatically opened to cut off the switching circuit B-4 from the battery B. Subsequent operation is similar to that described in connection with the automatic diaphragm control mode.

When the actual voltage of the battery B has dropped below the satisfactory operating level, the operator needs to remove the battery B from the chamber 112 after the shutter dial 51 is turned to place one of the faster speeds 1/15 to 1/1000 second in registry with the index 52, thereby the switch S$_6$ is set to "a" position by the lever 108. Thus, the electrical energy from the generator G is fed to the release actuating circuit including the magnetic winding Mg$_2$ and the shutter control circuit including the magnetic winding Mg$_3$ alone, while the light-measuring circuit B-1, exposure value computer B-2, memory circuit B-2', display circuit B-3 and diaphragm control circuit B-4 are no longer effective to operate. At the same time, the clutch gear 104 is brought into engagement with both of the gears 41 and 105 so that motion of the film winding shaft 7 is transmitted to drive the power gear 106 while charging the spring 107. When the gear 105 nears the terminal end of one revolution, the gear 106 is latched by the lever 109. A slight further rotation of the gear 105 brings its toothless portion 105a into radial alignment with the gear 106, thereby over-load is prevented from being placed on the power gear 106.

When the shutter button is depressed to strike the lever 109 at its tail, the gear 106 is driven by the spring 107 to rotate in engagement with the pinion 110 of the generator G. The electrical energy produced from the generator G is stored on the condensers C$_4$, C$_2$ and C$_3$ through the diodes D$_1$, D$_2$ and D$_3$. Upon further depression of the shutter button to the second stroke, the switch S$_2$ is closed to turn on the transistor Tr so that the timing circuit R$_T$, C$_T$ is made operative with the condenser C$_4$. Energization of the magnetic winding Mg$_2$ from the condenser C$_2$ causes the switch S$_4$ to open. At the time when the comparator C-2 produces a low level output, the magnetic winding Mg$_3$ is energized from the condenser C$_3$. It is to be noted here that the size of opening of the diaphragm aperture is adjusted to a manually preset value.

It will be seen from the foregoing that the present invention contemplates the use of an electric generator in combination with a novel coordinating system so that an exposure can be made with selective control of shutter speed over a wider range than was previously possible without the necessity of using any mechanical governor as in the prior art. This feature of the invention facilitates simplification of camera structure, and broadening of capabilities thereof.

What is claimed is:

1. A camera having an automatic exposure control apparatus, comprising:
    (a) an automatic exposure control circuit including a light measuring circuit, and a computer circuit;
    (b) an exposure time control circuit for electrically controlling shutter time;
    (c) an electromagnetic release circuit;
    (d) an electrical power source battery incorporated in the camera to enable operation of the aforesaid circuits; and
    (e) change over means for supplying electrical power from an electric generator only to said exposure time control circuit and said electromagnetic release circuit.

2. A camera according to claim 1, wherein said change over means is operated in response to removal of said battery from said camera.

3. A camera according to claim 1, further including manually operable shutter time setting means and detent means engageable with said setting means and where when said generator is electrically connected to said exposure time control circuit and said electromagnetic release circuit, said detent means limiting the shutter speed range to a narrower range in response to operation of the changeover means.

* * * * *